US012093012B2

(12) United States Patent
Lee

(10) Patent No.: US 12,093,012 B2
(45) Date of Patent: Sep. 17, 2024

(54) PROGRAMMABLE LOGIC CONTROLLER, MOVING IMAGE MANAGEMENT DEVICE, MOVING IMAGE MANAGEMENT SYSTEM, AND METHOD FOR MANAGING MOVING IMAGE

(71) Applicant: Mitsubishi Electric Corporation, Tokyo (JP)

(72) Inventor: Weihau Lee, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/266,288

(22) PCT Filed: Jun. 8, 2021

(86) PCT No.: PCT/JP2021/021786
§ 371 (c)(1),
(2) Date: Jun. 9, 2023

(87) PCT Pub. No.: WO2022/259379
PCT Pub. Date: Dec. 15, 2022

(65) Prior Publication Data
US 2024/0027985 A1    Jan. 25, 2024

(51) Int. Cl.
G05B 19/05     (2006.01)
G11B 27/10     (2006.01)
H04N 5/77      (2006.01)

(52) U.S. Cl.
CPC ......... *G05B 19/058* (2013.01); *G05B 19/054* (2013.01); *G11B 27/10* (2013.01); *H04N 5/77* (2013.01)

(58) Field of Classification Search
CPC .... G05B 19/058; G05B 19/054; G11B 27/10; H04N 5/77; G09G 2340/0435; G09G 5/12
See application file for complete search history.

(56) References Cited

U.S. PATENT DOCUMENTS 6,005,638 A * 12/1999 Blair .................. H04N 5/21
                                                            348/E5.077
2005/0057471 A1 * 3/2005 Lu .................. G09G 3/3611
                                                            345/89

(Continued)

FOREIGN PATENT DOCUMENTS

JP    2018-073185 A    5/2018
JP    2020-013526 A    1/2020

(Continued)

OTHER PUBLICATIONS

International Search Report and Written Opinion mailed on Aug. 10, 2021, received for PCT Application PCT/JP2021/021786, filed on Jun. 8, 2021, 8 pages including English Translation.

*Primary Examiner* — Hong Zhou
(74) *Attorney, Agent, or Firm* — XSENSUS LLP

(57) ABSTRACT

A programmable logic controller or PLC (10) includes a clock element (120), a log recorder (101) that records a log together with a record time into a storage device (110) based on a clock signal output from the clock element, an image data acquirer (102) that acquires moving image data indicating a moving image captured by an imaging device from the imaging device, a frame rate measurer (103) that measures a frame rate of the moving image indicated by the moving image data based on the clock signal output from the clock element (120), a corrector (104) that corrects a time to be affixed to the moving image indicated by the moving image data based on the frame rate, and an image storage (105) that stores, into the storage device (110), new moving image (DM) data indicating a moving image affixed with the time corrected by the corrector (104).

5 Claims, 14 Drawing Sheets

(56) References Cited

U.S. PATENT DOCUMENTS

| | | | |
|---|---|---|---|
| 2013/0335554 A1* | 12/2013 | Brunner | H04N 23/6812 |
| | | | 348/135 |
| 2015/0213838 A1 | 7/2015 | Dinev et al. | |
| 2020/0125061 A1 | 4/2020 | Miyasaka | |
| 2020/0259998 A1 | 8/2020 | Tsujikawa | |
| 2020/0310733 A1* | 10/2020 | Fujimura | G06F 3/04883 |
| 2021/0148510 A1 | 5/2021 | Miyake et al. | |

FOREIGN PATENT DOCUMENTS

| | | |
|---|---|---|
| JP | 2020-134985 A | 8/2020 |
| JP | 2021-082028 A | 5/2021 |

* cited by examiner

PROGRAMMABLE LOGIC CONTROLLER, MOVING IMAGE MANAGEMENT DEVICE, MOVING IMAGE MANAGEMENT SYSTEM, AND METHOD FOR MANAGING MOVING IMAGE

CROSS-REFERENCE TO RELATED APPLICATION

The present application is based on PCT filing PCT/JP2021/021786, filed Jun. 8, 2021, the entire contents of which are incorporated herein by reference.

TECHNICAL FIELD

The present disclosure relates to a programmable logic controller, a moving image management device, a moving image management system, a moving image management method, and a program.

BACKGROUND ART

In the field of factory automation (FA), logs recorded by a programmable logic controller (PLC) and moving images of a production facility captured by an imaging device may be used to identify the cause of a trouble at the production facility. For example, when a production facility operates abnormally, a moving image of the abnormal operation is compared with the log acquired at the time affixed to the moving image to identify the cause of the abnormal operation. The time affixed to the moving image may be, for example, the time at which each frame of the moving image is captured by an imaging device or the time at which data of each frame of the moving image is acquired by the PLC.

Any inconsistency between the time affixed to the moving image and the log record time can cause difficulty in identifying the cause. A technique for matching the time affixed to the moving image with the log record time is thus awaited.

Patent Literature 1 describes a technique for accurately synchronizing the time affixed to the moving image with the log record time by connecting an imaging device with a PLC with a dedicated low-delay imaging trigger line. The technique described in Patent Literature 1 can match the time affixed to the moving image with the log record time.

CITATION LIST

Patent Literature

Patent Literature 1: Unexamined Japanese Patent Application Publication No. 2020-134985

SUMMARY OF INVENTION

Technical Problem

The technique described in Patent Literature 1 uses the dedicated imaging trigger line to connect the imaging device and the PLC. The technique thus does not allow use of widespread imaging devices such as network cameras or webcams and uses a dedicated imaging device compatible with the imaging trigger line.

An objective of the present disclosure is to provide a programmable logic controller and associated techniques that can match the time affixed to a moving image captured by a common imaging device with the log record time recorded by a PLC.

Solution to Problem

To achieve the above objective, a programmable logic controller according to an aspect of the present disclosure includes a clock element, log record means for recording a log together with a record time into a first storage device based on a clock signal output from the clock element, image data acquisition means for acquiring moving image data indicating a moving image captured by an imaging device from the imaging device, frame rate measurement means for measuring a frame rate of the moving image indicated by the moving image data based on the clock signal output from the clock element, correction means for correcting a time to be affixed to the moving image indicated by the moving image data based on the frame rate, and image storage means for storing, into a second storage device, new moving image data indicating a moving image affixed with the time corrected by the correction means.

Advantageous Effects of Invention

The technique according to the above aspect of the present disclosure can match the time affixed to a moving image captured by a common imaging device with the log record time recorded by a PLC.

DESCRIPTION OF EMBODIMENTS

Figure 1:
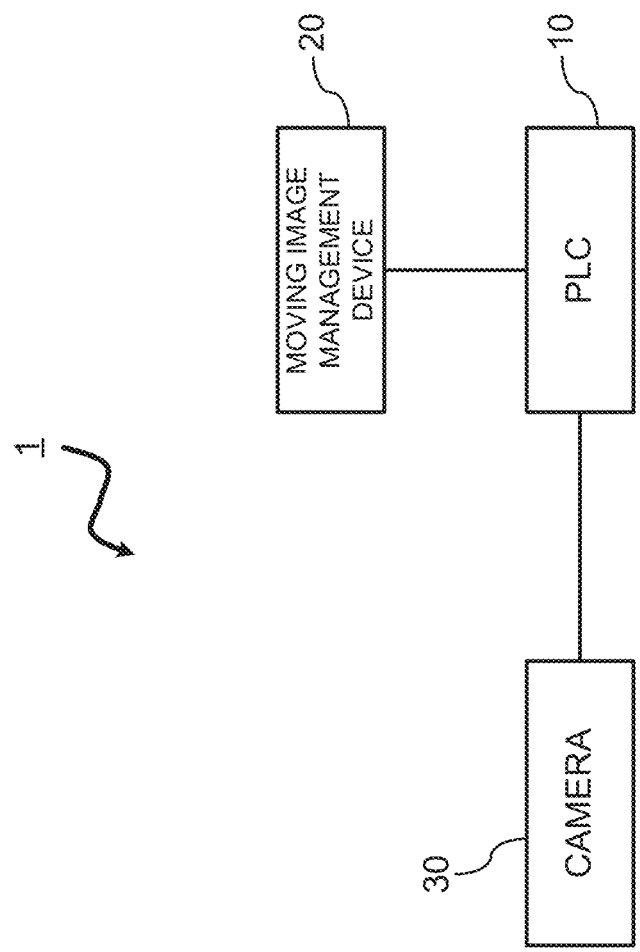
FIG. 1 is a block diagram of a moving image management system according to Embodiment 1 of the present disclosure.

A moving image management system according to one or more embodiments of the present disclosure is described with reference to the drawings. In the drawings, the same reference signs denote the same or equivalent components.

Embodiment 1

A moving image management system 1 according to Embodiment 1 is described with reference to FIG. 1. The moving image management system 1 is installed at, for example, a production site including a production facility. The moving image management system 1 includes a programmable logic controller (PLC) 10, a moving image management device 20, and a camera 30. As described later, the moving image management system 1 can match the time affixed to a moving image of the production facility captured by the camera 30 with the record time of a log recorded by the PLC 10. The moving image management system 1 is an example of a moving image management system according to an aspect of the present disclosure.

The PLC 10 and the moving image management device 20 are connected with, for example, a general-purpose communication cable to communication with each other. Similarly, the PLC 10 and the camera 30 are connected with, for example, a general-purpose communication cable to communicate with each other. The general-purpose communication cable is, for example, a common communication cable such as a general-purpose universal serial bus (USB) cable or a general-purpose network cable. These communication cables are not dedicated to a specific use such as for achieving markedly low jitter or latency.

The camera 30 is a common imaging device such as a network camera or a webcam that are commercially available. The common imaging device such as a network camera or a webcam is manufactured without being expected to transmit moving image data with markedly low jitter and markedly low latency. The camera 30 continuously captures images of a production facility at regular intervals. The camera 30 transmits moving image data indicating the moving image acquired by continuously capturing images of the production facility to the PLC 10. Although FIG. 1 simply illustrates one camera 30, the moving image management system 1 may include multiple cameras 30. The camera 30 is an example of an imaging device according to an aspect of the present disclosure.

The PLC 10 being a programmable logic controller is connected to components such as a sensor and an actuator (not illustrated) other than the moving image management device 20 and the camera 30. The PLC 10 acquires moving image data indicating the moving image captured by the camera 30 from the camera 30. As described later, the PLC 10 records a log of the operation of the PLC 10. The PLC 10 corrects the time to be affixed to the moving image indicated by the acquired moving image data and stores the moving image data. The PLC 10 is an example of a programmable logic controller according to an aspect of the present disclosure.

The moving image management device 20 reads the log recorded by the PLC 10 and the moving image data stored by the PLC 10 and performs interrelated reproduction of the log and the moving image. Interrelated reproduction refers to displaying, while a moving image is being reproduced, the log at the time affixed to the moving image being reproduced together with the moving image. This interrelated reproduction allows, for example, the user to learn, through viewing moving image of which interrelated reproduction has been performed, the state of the production facility at the time at which abnormal data is recorded in the log. When the user identifies an abnormality in the production facility through viewing the moving image, the user can view the log of which interrelated reproduction has been performed to examine the data recorded in the log at the time the abnormality occurs. The moving image management device 20 is an example of a moving image management device in an aspect of the present disclosure.

Although described below in detail, the moving image management device 20 according to Embodiment 1 corrects temporal difference between the log and the moving image based on the definition from the user to perform interrelated reproduction.

Inconsistency in the moving image to be avoided in the moving image management system 1 is described with reference to FIG. 2.

The timeline for imaging is first described. The timeline for imaging indicates that the camera 30 captures images of the production facility at regular intervals to acquire sequential images. Each vertical tick line on the time axis indicates one captured image, or more specifically, one frame in the moving image. In the timeline for imaging, the vertical tick lines are at regular intervals and indicate that the frames of the moving image are acquired at regular intervals. Upon acquiring each frame, the camera 30 transmits image data indicating the frame to the PLC 10.

The frames acquired at regular intervals by the camera 30 during imaging may not be received by the PLC 10 at regular intervals due to jitter. Additionally, the camera 30 includes a clock element different from the clock element included in the PLC 10 to cause a clock difference. Thus, the time interval between frames during imaging by the camera 30 may differ from the time interval between frames at the reception by the PLC 10. The camera 30 and the PLC 10 are connected with a general-purpose communication cable, and thus cause latency as well in transmission of each frame.

The time at which the camera 30 captures each frame thus typically differs from the time at which the PLC 10 receives image data indicating the frame. Thus, the moving image associated with the log based on the time at which the PLC 10 receives each frame actually has inconsistency between the time affixed to each frame and the time affixed to the log. In the example below, the clock difference, jitter, and latency that can cause inconsistency are described in detail.

The clock difference is first described. The timeline for the clock difference in FIG. 2 indicates the frame intervals at the reception by the PLC 10 when the clock difference alone occurs without jitter and latency. In the timeline for the clock difference, frame intervals are regular, but are different from the intervals in the imaging due to the clock difference. For example, the timeline for the clock difference indicates that the time length corresponding to seven frames at the reception is longer than the time length corresponding to seven frames in the imaging. Thus, the time at the reception and the time in the imaging are different and can cause inconsistency when the moving image and the log are associated with each other.

Jitter is now described. The timeline for jitter in FIG. 2 indicates the frame intervals at the reception by the PLC 10 when jitter alone occurs without the clock difference and latency. As indicated by the timeline for jitter, the intervals between frames at the reception are irregular or fluctuate due to jitter. Thus, the time at the reception and the time in the imaging are different and can cause inconsistency when the moving image and the log are associated with each other.

Latency is now described. The timeline for latency in FIG. 2 indicates the frame intervals at the reception by the PLC 10 when latency alone occurs without the clock difference and jitter. In the timeline for latency, the reception time of each frame lags behind the time in the imaging although the frame intervals are regular and equal to the intervals in the imaging. This lag or latency results from, for example, delay caused by a communication cable or a communication interface. Thus, the time at the reception and the time in the imaging differ and can cause inconsistency when the moving image and the log are associated with each other. Latency caused by, for example, a communication cable or a communication interface is expected to be substantially regular.

Figure 2:
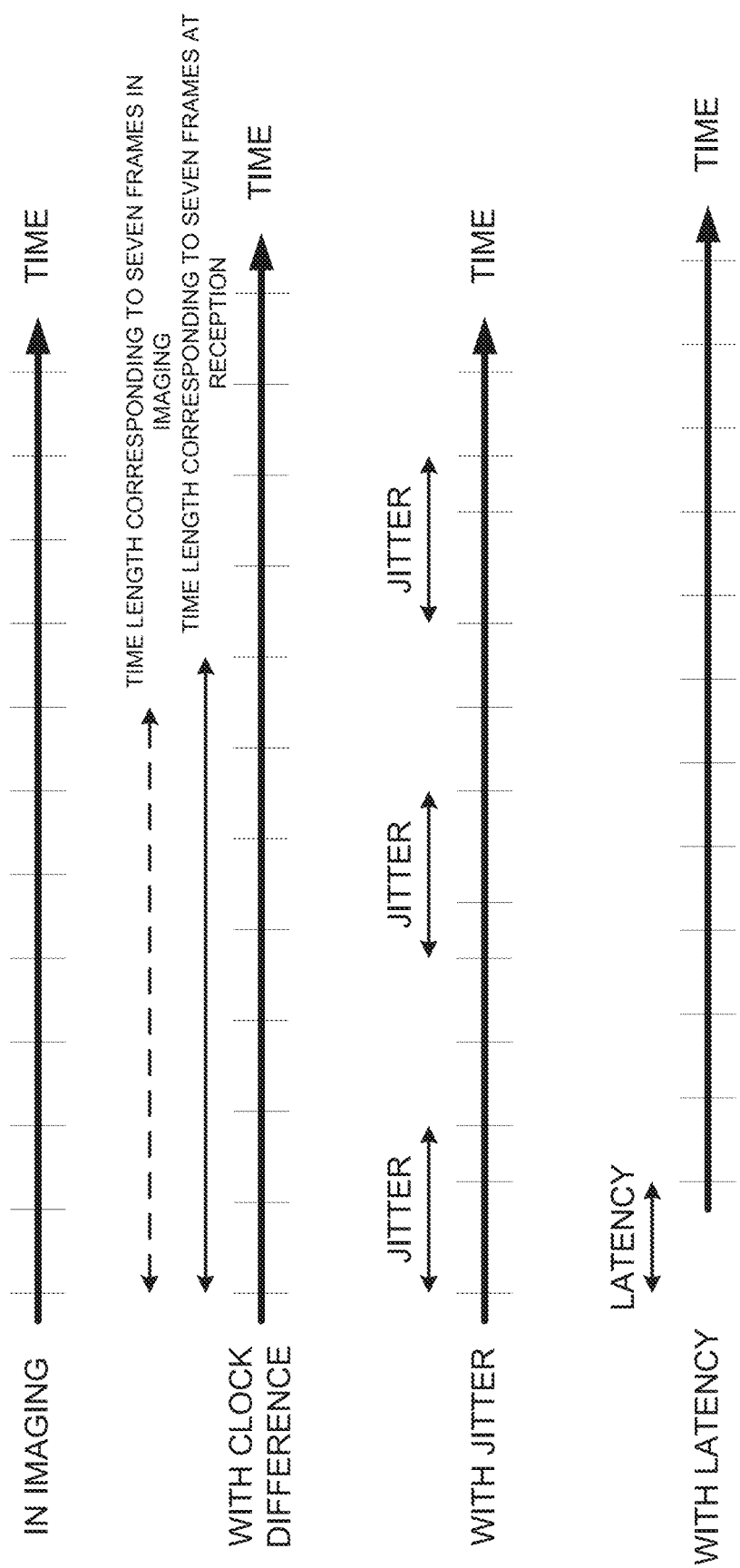
FIG. 2 is a diagram describing inconsistency in a moving image to be avoided in the moving image management system according to Embodiment 1 of the present disclosure.

Although any one of the clock difference, jitter, or latency occurs in each timeline in FIG. 2, all of the clock difference, jitter, and latency occur typically. The inconsistency from these three causes is to be removed.

As described later, the PLC 10 responds to such a clock difference and jitter, and the moving image management device 20 responds to latency.

Figure 3:
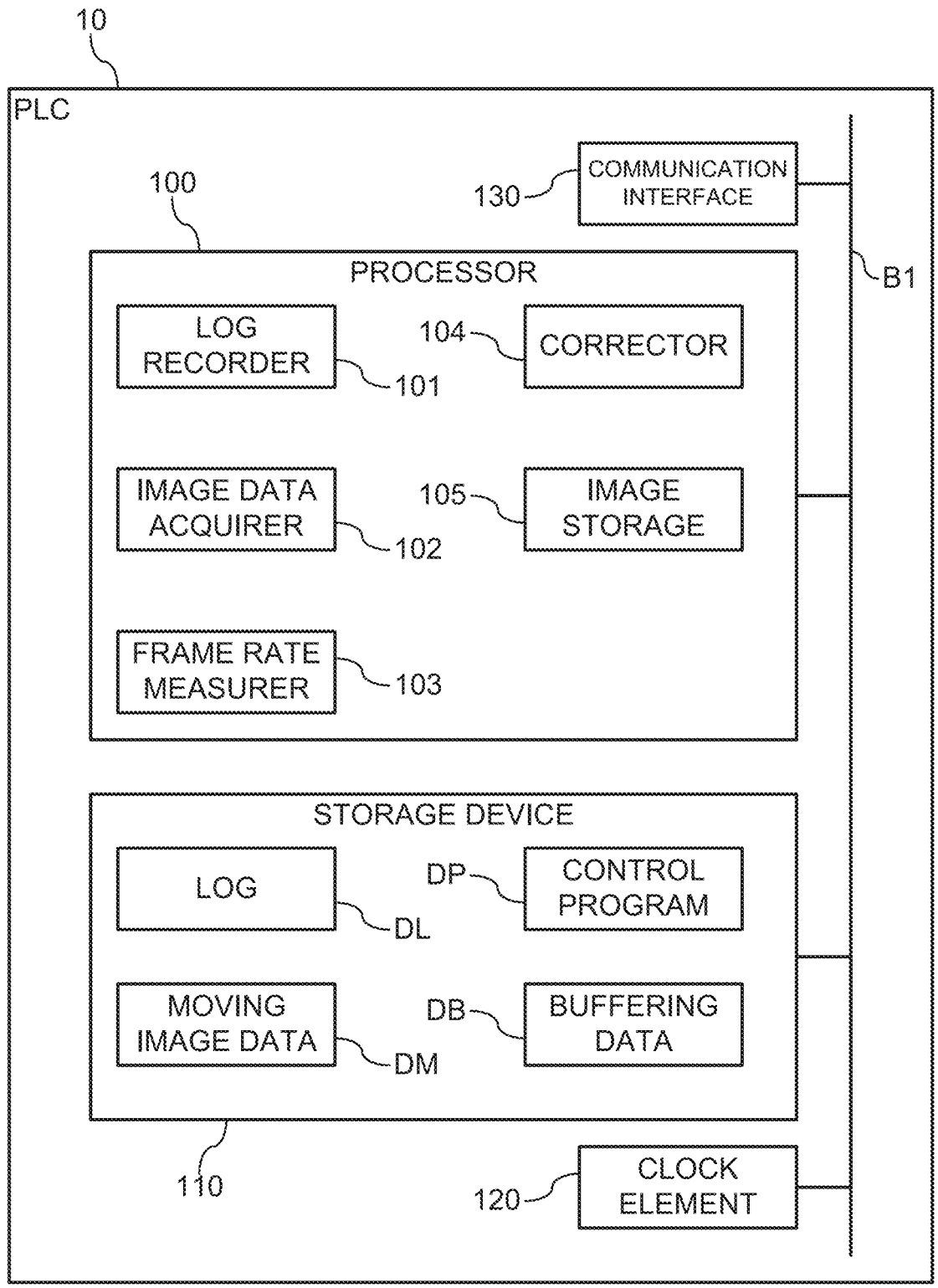
FIG. 3 is a block diagram of a PLC according to Embodiment 1 of the present disclosure.

The configuration of the PLC 10 is described with reference to FIG. 3. The PLC 10 includes a processor 100, a storage device 110, a clock element 120, and a communication interface 130. The processor 100, the storage device 110, the clock element 120, and the communication interface 130 are connected with a bus B1 to communicate with one another.

The processor 100 is, for example, a central processing unit (CPU). Each function of the processor 100 described later is implemented by the processor 100 reading and executing a control program DP stored in the storage device 110.

The storage device 110 includes, for example, a random-access memory (RAM), a hard disk drive (HDD), or a solid-state drive (SSD). The storage device 110 stores a log DL, moving image data DM, the control program DP, and buffering data DB. The log DL, the moving image data DM, and the buffering data DB are described later. The storage device 110 functions as a work memory when the processor 100 reads and executes the control program DP. The storage device 110 is an example of each of a first storage device and a second storage device in an aspect of the present disclosure.

The clock element 120 outputs clock signals for the processor 100, the storage device 110, and the communication interface 130 to operate. The clock element 120 is an example of a clock element in an aspect of the present disclosure.

The communication interface 130 is, for example, a common communication interface such as a USB interface or a network interface. The communication interface 130 connected to the moving image management device 20 and the camera 30 allows the PLC 10 to communicate with the moving image management device 20 and the camera 30.

Each function implemented by the processor 100 reading and executing the control program DP is described. The processor 100 reads and executes the control program DP to implement functional components including a log recorder 101, an image data acquirer 102, a frame rate measurer 103, a corrector 104, and an image storage 105.

The log recorder 101 records, as the log DL in the storage device 110, the log of, for example, sensor data acquired from a sensor (not illustrated) or data indicating the internal state of the PLC 10. The log recorder 101 records the log together with the record time based on the clock signal output from the clock element 120. The log recorder 101 is an example of log record means in an aspect of the present disclosure.

The image data acquirer 102 acquires moving image data indicating a moving image captured by the camera 30 and stores the moving image data as buffering data DB into the storage device 110 to buffer the moving image data. The image data acquirer 102 also stores the reception time of each frame into the buffering data DB. The reception time of each frame is acquired based on the clock signal output from the clock element 120. The buffering data DB has an upper limit capacity. When the data size of the buffering data DB reaches the upper limit capacity, the oldest data is deleted. The buffering data DB has, for example, a ring buffer data structure. The buffering data DB has, for example, a data size to store a moving image of about 30 minutes long. The image data acquirer 102 is an example of image data acquisition means in an aspect of the present disclosure.

The frame rate measurer 103 reads moving image data buffered in the storage device 110 and measures the frame rate of the moving image indicated by the moving image data based on the clock signal output from the clock element 120. The frame rate measurer 103 is an example of frame rate measurement means in an aspect of the present disclosure.

The frame rate measurement is now described with reference to FIG. 4. The frames of the moving image have sequential frame numbers in time series. For example, the frame number of the frame captured immediately after the activation of the camera 30 is 0, the frame number of the frame captured after the frame with the frame number 0 is 1, and the following frame number is 2.

Figure 4:
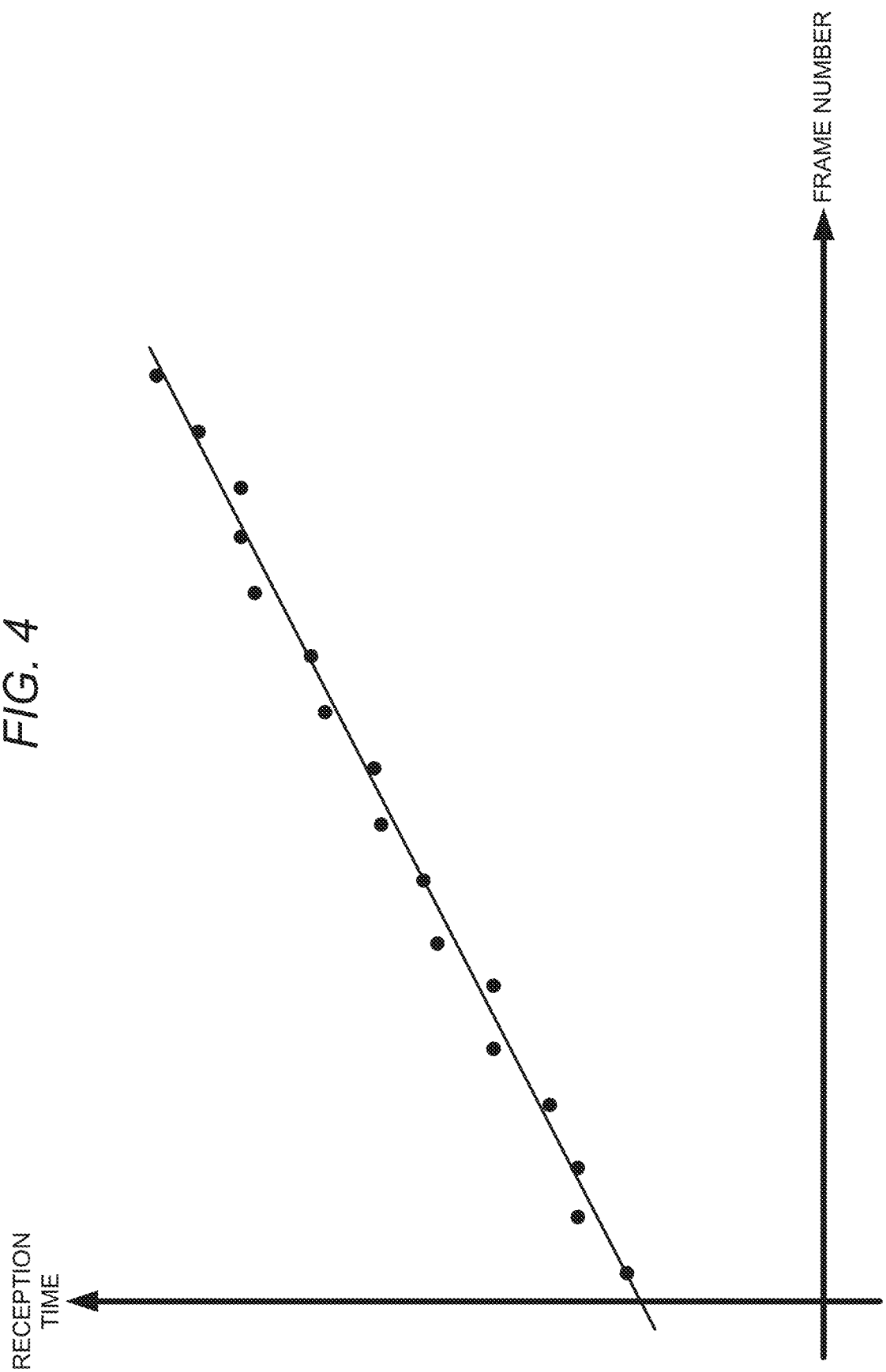
FIG. 4 is a graph illustrating correction of a moving image captured by the PLC according to Embodiment 1 of the present disclosure.

The dots in the graph in FIG. 4 indicate the correspondence between the reception time and the frame number of each frame in the moving image data stored in the buffering data DB. The straight line extending near the dots in FIG. 4 is acquired by the least squares method applied to each frame number and each reception time. This straight line is expressed with, for example, Formula 1 below:

$$y = 0.0169x + D \quad (1)$$

where x is the frame number, y is the reception time, and D is the y-intercept. The coefficient 0.0169 of x in this formula is an average frame interval. In other words, the reciprocal of the coefficient is the frame rate. Thus, measuring the frame rate is equivalent to calculating Formula 1.

The reception time in the buffering data DB is affixed based on the clock signal output from the clock element 120. Formula 1 is also acquired based on the clock signal. The reception time calculated from Formula 1 based on the clock signal is thus free of an issue associated with the clock difference. Formula 1 is a linear function of the frame number x, and thus, the difference in the reception time between the frames calculated from Formula 1 is regular. The reception time calculated from Formula 1 is thus also free of an issue associated with jitter. In other words, the reception time calculated from Formula 1 is free of the issues of both clock difference and jitter.

As described later, the issues of clock difference and jitter alone are removed in this state, whereas an issue associated with latency is to be removed by the moving image management device 20. More specifically, the frame rate measurer 103 removes the issues of both clock difference and jitter by measuring the frame rate of the moving image indicated by the moving image data (or by calculating Formula 1) based on the clock signal output from the clock element 120.

Referring back to FIG. 3, the corrector 104 corrects the reception time affixed to each frame of the moving image using Formula 1 based on the frame rate measured by the frame rate measurer 103. Although the corrector 104 corrects the time independently of latency, the moving image management device 20 responds to latency as described above. The corrector 104 is an example of correction means in an aspect of the present disclosure.

Upon generation of a trigger, the image storage 105 extracts, from the moving image data included in the buffering data DB, moving image data acquired around the time at which the trigger is generated and stores, into the storage device 110, as the moving image data DM, new moving image data including the frames with the reception time corrected by the corrector 104 being affixed. The trigger herein refers to a signal for instructing the image storage 105 to store the moving image. The trigger is generated when, for example, a log indicating an abnormality of the production facility is recorded in the log DL. The moving image before and after the occurrence of the abnormality in the production facility is highly likely to be used. The image storage 105 stores the moving image in response to the trigger. The time around the time at which the trigger is generated is, for example, within two minutes before and after the trigger generation. The image storage 105 is an example of image storage means in an aspect of the present disclosure.

Figure 5:
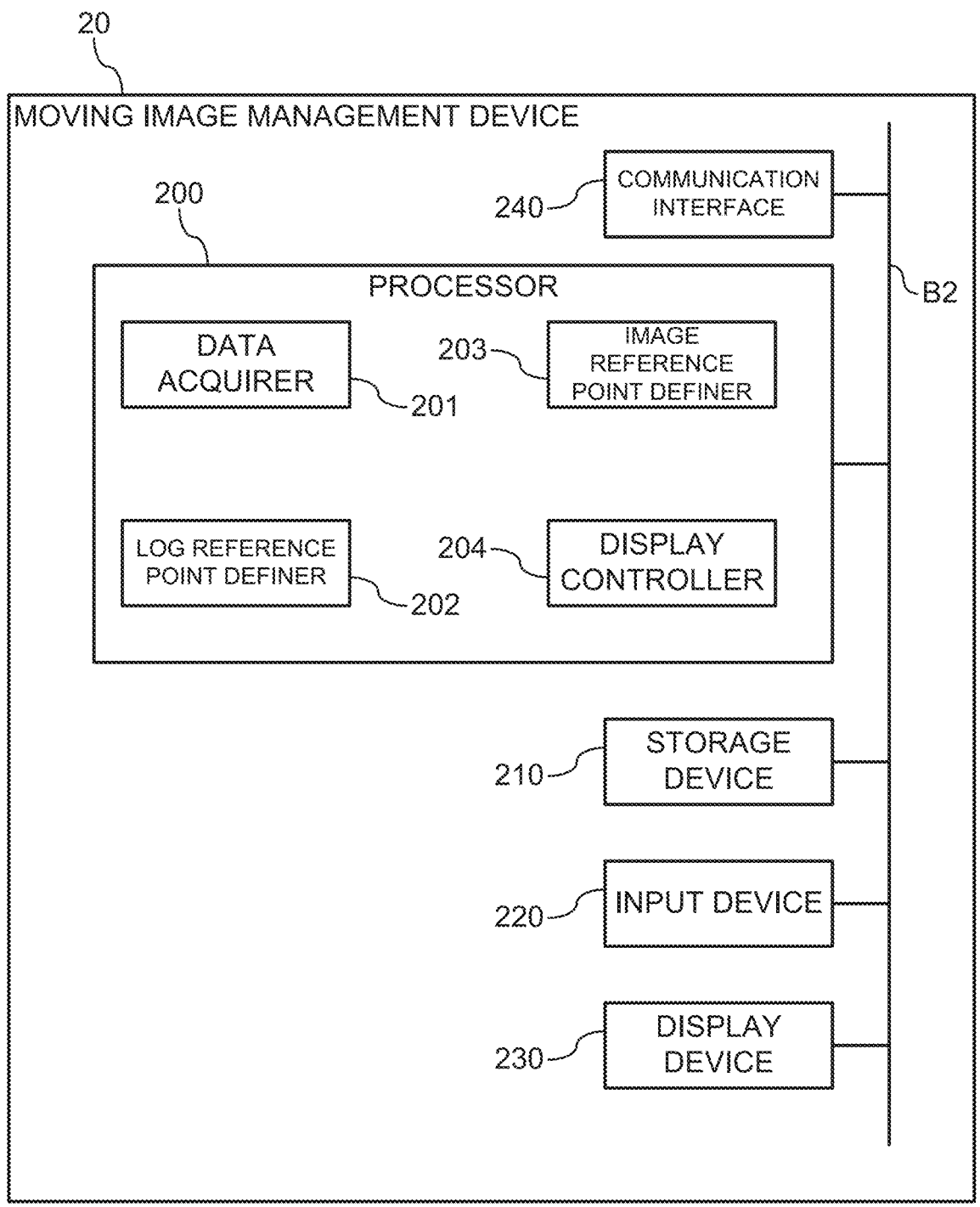
FIG. 5 is a block diagram of a moving image management device according to Embodiment 1 of the present disclosure.

The configuration of the moving image management device 20 is described with reference to FIG. 5. The moving image management device 20 includes a processor 200, a storage device 210, an input device 220, a display device 230, and a communication interface 240. The processor 200, the storage device 210, the input device 220, the display device 230, and the communication interface 240 are connected with a bus B2 to communicate with one another. The moving image management device 20 is a computer such as a personal computer or a smartphone.

The processor 200 is, for example, a CPU. Each function described below is implemented by the processor 100 reading and executing the control program stored in the storage device 210.

The storage device 210 includes, for example, a RAM, an HDD, or an SSD. The storage device 210 stores a control program executable by the processor 200. The control program is, for example, an engineering tool program provided by the manufacturer of the PLC 10. The storage device 110 serves as a work memory when the processor 200 reads and executes the control program.

The input device 220 outputs signals based on a user input. The input device 220 is, for example, a touchscreen integrated with the display device 230 described below. In some embodiments, the input device 220 may be an input device such as a keyboard or a mouse.

The display device 230 displays information to be provided to the user based on the control performed by a display controller 204 described later. The display device 230 is, for example, a touchscreen integrated with the input device 220. In some embodiments, the display device 230 may be an independent display. The display device 230 is an example of display means in an aspect of the present disclosure.

The communication interface 240 is a common communication interface such as a USB interface or a network interface. The communication interface 240 connected to the PLC 10 allows the moving image management device 20 to communicate with the PLC 10.

Each function implemented by the processor 200 reading and executing the control program stored in the storage device 210 is described. The processor 200 reads and executes the control program to implement functional components including a data acquirer 201, a log reference point definer 202, an image reference point definer 203, and the display controller 204.

The data acquirer 201 communicates with the PLC 10 through the communication interface 240 and acquires the moving image data DM and the log DL stored in the storage device 110 in the PLC 10.

Figure 6:
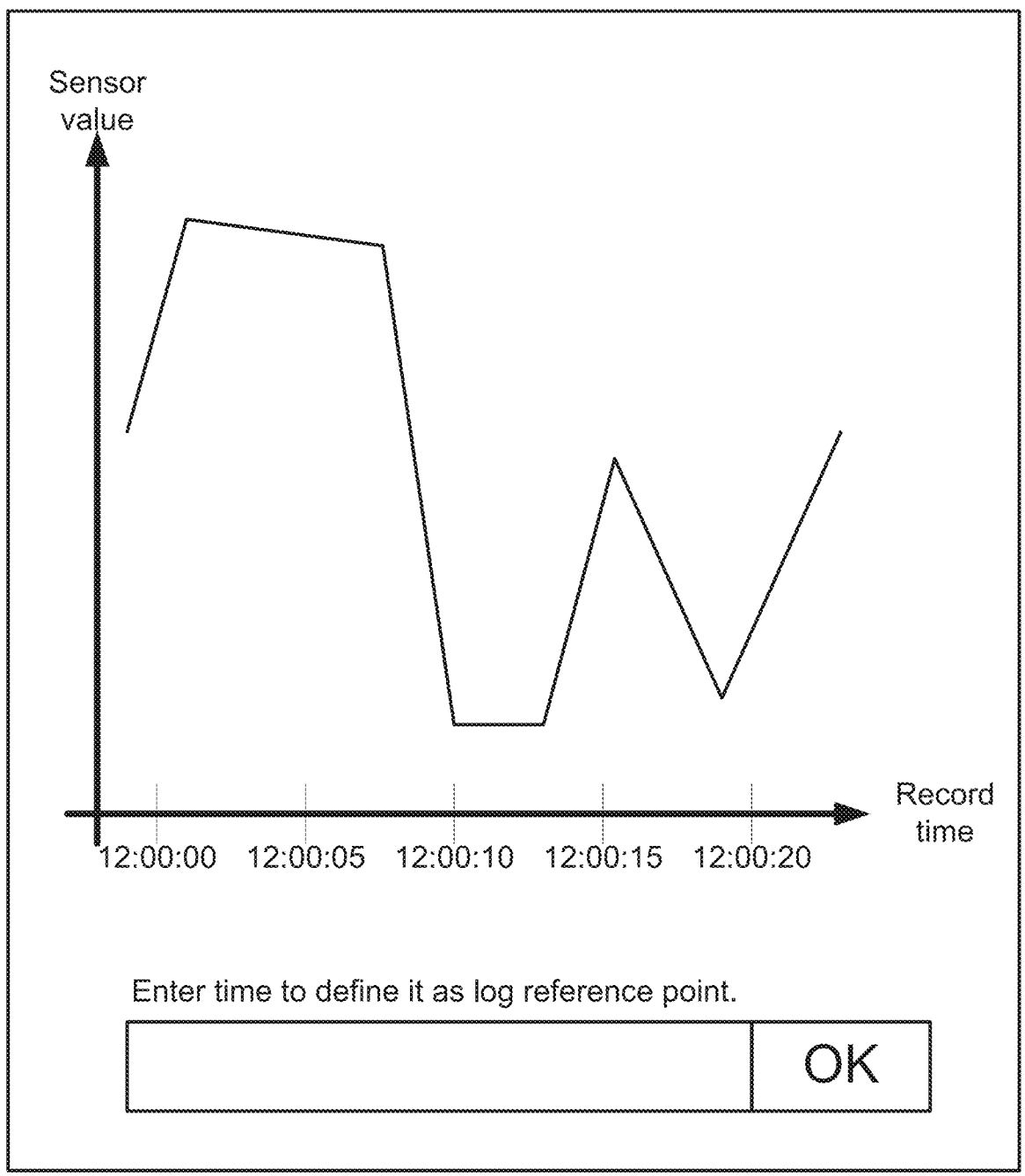
FIG. 6 is a diagram of an example screen for defining a log reference point displayed by the moving image management device according to Embodiment 1 of the present disclosure.

The log reference point definer 202 defines, based on a user input, a log reference point that is a time-series reference point in the log DL. For example, the log reference point definer 202 causes the display controller 204 (described below) to display the screen as illustrated in FIG. 6. The screen illustrated in FIG. 6 displays a graph of the log of sensor values in time series to prompt the user to define the time serving as the log reference point. For example, the user may define the time 12:00:13.000 as the log reference point based on the graph displayed on the screen illustrated in FIG. 6. In this case, the user inputs the time 12:00:13.000 in milliseconds in the text box on the left of the OK button, and then presses the OK button. In this manner, the user can define the time 12:00:13.000 as the log reference point. The log reference point definer 202 is an example of log reference point definition means in an aspect of the present disclosure.

Figure 7:
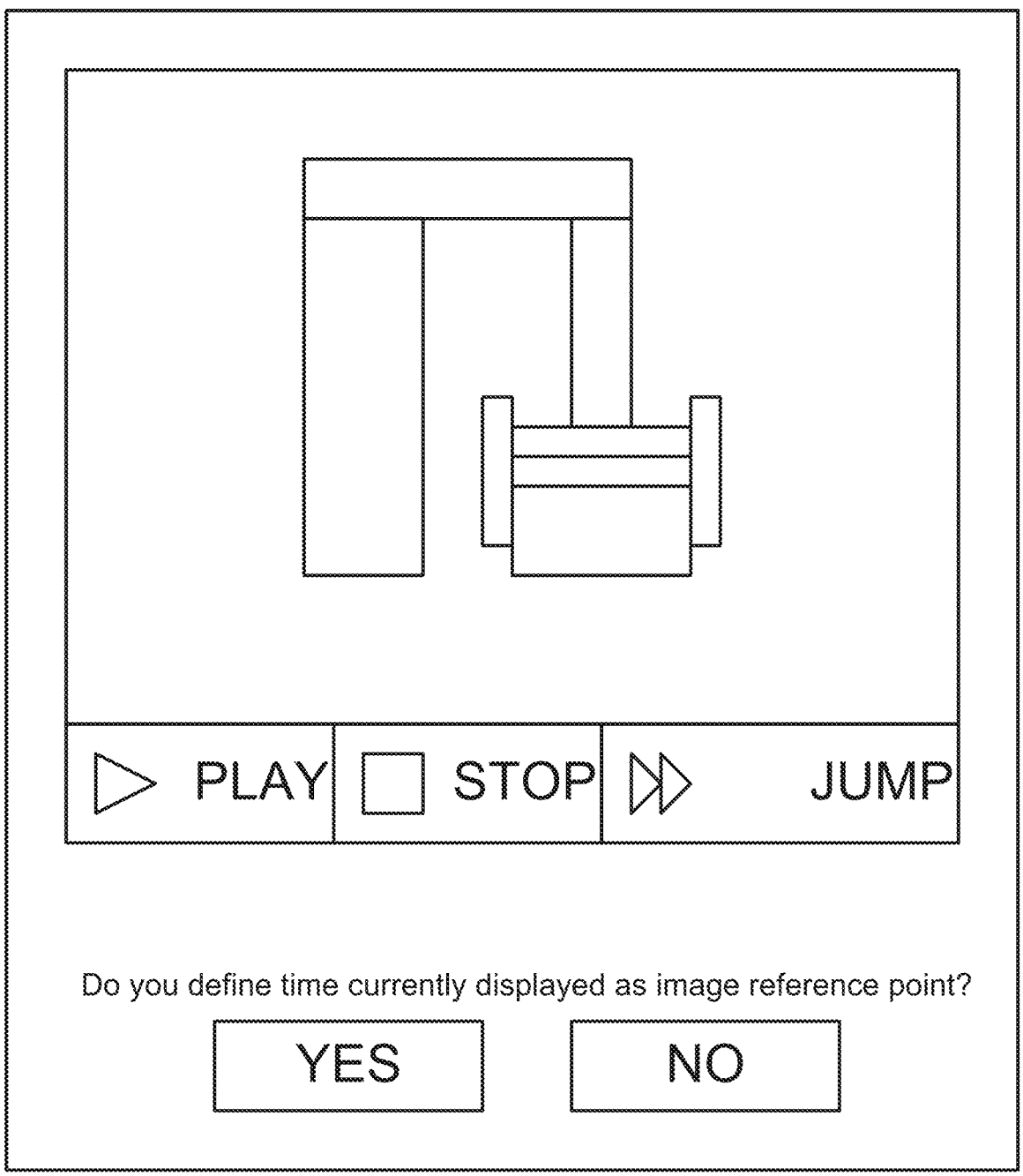
FIG. 7 is a diagram of an example screen for defining an image reference point displayed by the moving image management device according to Embodiment 1 of the present disclosure.

The image reference point definer 203 defines, based on a user input, the image reference point that is the time-series reference point in the moving image indicated by the moving image data DM. For example, the image reference point definer 203 causes the display controller 204 (described below) to display the screen as illustrated in FIG. 7. The screen illustrated in FIG. 7 reproduces the moving image of the production facility to prompt the user to define the time point to be the image reference point. For example, the user may define the time point at the frame currently reproduced on the screen in FIG. 6 as the image reference point. In this case, the user presses the stop button to stop the moving image and then selects the yes button at a lower portion of the screen to define the time point at the currently displayed frame as the image reference point. The image reference point definer 203 is an example of image reference point definition means in an aspect of the present disclosure.

The user is to define, as the image reference point, the time point expected to be identical to the time defined as the log reference point. For example, the user is to define, as the log reference point, the time at which an abnormality is expected to occur in the sensor data based on the log and to define, as the image reference point, the time at which an abnormality is expected to occur in the production facility based on the moving image.

The display controller 204 controls the display device 230 to performs interrelated reproduction of the log DL and the moving image indicated by the moving image data DM to align the log reference point with the image reference point. The display controller 204 performs interrelated reproduction to align the log reference point with the image reference point and corrects the time difference resulting from latency to synchronously reproduce the log DL and the moving image. Thus, the moving image management device 20 can remove the issue of latency. The display controller 204 is an example of display control means in an aspect of the present disclosure.

Figure 8:
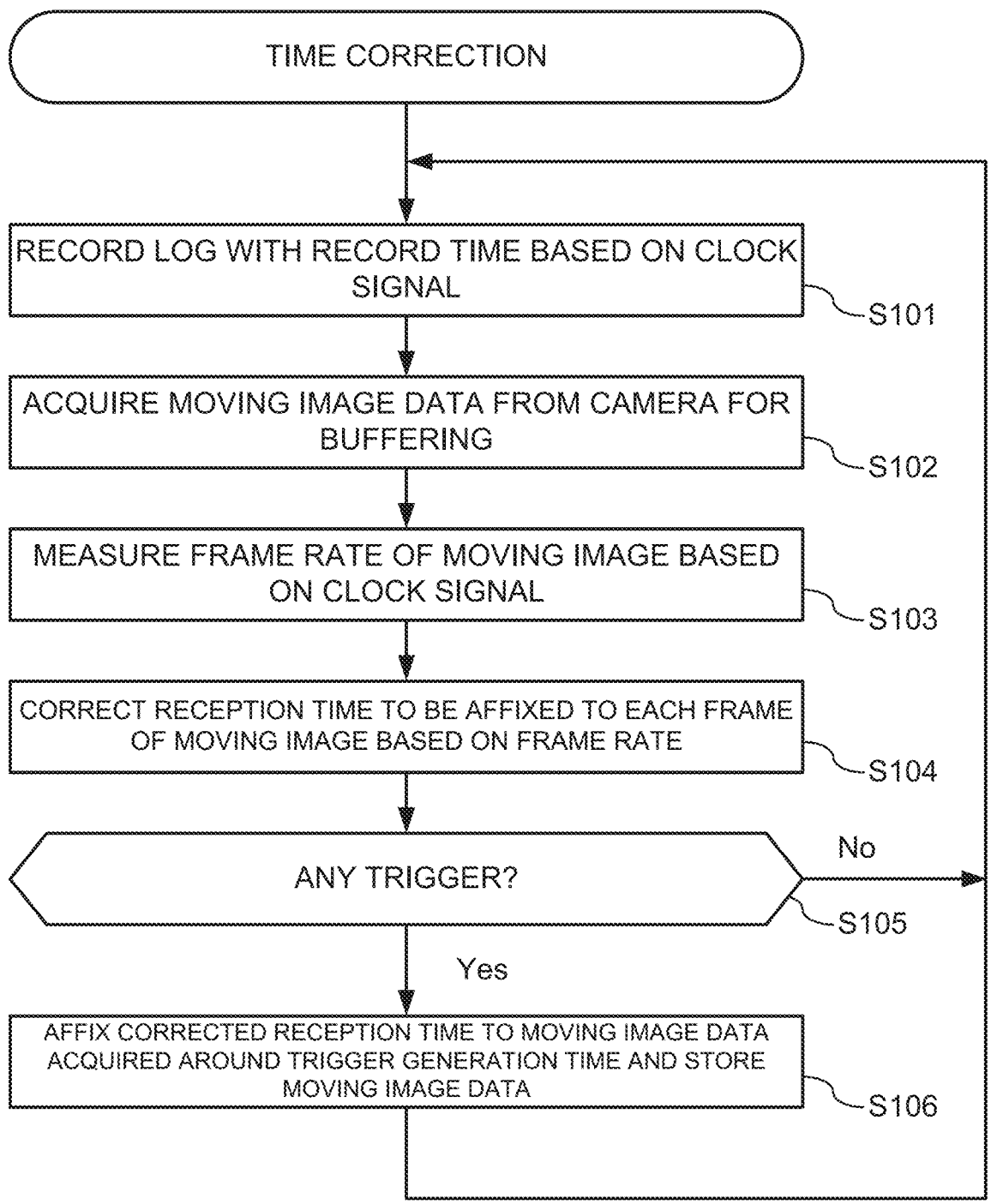
FIG. 8 is a flowchart of an example time correction operation performed on a moving image by the PLC in Embodiment 1 of the present disclosure.

An example operation performed by the PLC 10 to correct the time of the moving image is described with reference to FIG. 8.

The log recorder 101 in the PLC 10 records the log DL into the storage device 110 together with the record time based on the clock signal output from the clock element 120 (step S101).

The image data acquirer 102 in the PLC 10 acquires moving image data from the camera 30 and buffers the moving image data in the storage device 110 (step S102).

The frame rate measurer 103 in the PLC 10 measures the frame rate of the moving image indicated by the buffered moving image data based on the clock signal output from the clock element (step S103). More specifically, the frame rate measurer 103 calculates the average frame interval with the least squares method as described above.

The corrector 104 in the PLC 10 corrects the reception time to be affixed to each frame of the moving image based on the measured frame rate (step S104). This correction removes the issues of clock difference and jitter.

The image storage 105 in the PLC 10 determines whether any trigger has been generated (step S105). When the image storage 105 determines that no trigger has been generated (No in step S105), the processor 100 in the PLC 10 repeats the operation in step S101 and subsequent steps.

When determining that a trigger has been generated (Yes in step S105), the image storage 105 affixes corrected reception time to the moving image data acquired around the time at which the trigger is generated and stores the moving image data into the storage device 110 as the moving image data DM (step S106). The processor 100 then repeats the operation in step S101 and subsequent steps.

The time correction of the moving image performed by the PLC 10 described above removes the issues of clock difference and jitter. An example operation of interrelated reproduction of the log and the moving image performed by the moving image management device 20 is now described with reference to FIG. 9. This operation removes the issue of latency.

The data acquirer 201 in the moving image management device 20 reads the log DL from the PLC 10 (step S201).

The log reference point definer 202 in the moving image management device 20 waits for the user to define the log reference point (step S202). For example, the log reference point definer 202 causes the screen illustrated in FIG. 6 to be displayed as described above and waits for the user to define the log reference point.

The data acquirer 201 reads the moving image data DM from the PLC 10 (step S203).

The image reference point definer 203 in the moving image management device 20 waits for the user to define the image reference point (step S204). For example, the image reference point definer 203 causes the screen illustrated in FIG. 6 to be displayed as described above and waits for the user to define the image reference point.

The display controller 204 in the moving image management device 20 performs interrelated reproduction of the log DL and the moving image indicated by the moving image data DM to align the log reference point with the image reference point (step S205). This operation can correct latency and synchronously perform interrelated reproduction of the moving image and the log DL. After reproducing the moving image and the log DL, the processor 200 in the moving image management device 20 ends the interrelated reproduction operation.

In the moving image management system 1 according to Embodiment 1 described above, the frame rate measurer 103 in the PLC 10 first measures the frame rate based on the clock signal output from the clock element 120, and the corrector 104 in the PLC 10 corrects the reception time of each frame of the moving image based on the frame rate to remove the issues of clock difference and jitter. The log reference point definer 202 in the moving image management device 20 then causes the user to define the log reference point. The image reference point definer 203 in the moving image management device 20 causes the user to define the image reference point. The display controller 204 in the moving image management device 20 performs interrelated reproduction of the moving image and the log DL to align the log reference point with the image reference point to remove the issue of latency. The issues of clock difference, jitter, and latency can be removed, although the camera 30 is a common imaging device. Thus, the moving image management system 1 according to Embodiment 1 can match the time affixed to the moving image captured by a common imaging device with the log record time recorded by the PLC.

Modification of Embodiment 1

In Embodiment 1, the log DL, the moving image data DM, and the buffering data DB are stored in the same storage device 110, but may be stored in different storage devices. For example, the log DL and the buffering data DB may be stored in the storage device 110 included in the PLC 10, and the moving image data DM may be stored in an external storage device.

In Embodiment 1, the frame rate measurer 103 uses the least squares method to calculate the frame rate. However, when, for example, a large amount of moving image data is buffered, the least squares method may take higher costs to calculate all the frames. Thus, the frame rate measurer 103 may select a representative point from, for example, every 50 frames and uses the least squares method simply with the selected points. The representative point may be, for example, the median point of the points in the 50 frames or the mean value of the points.

When a small amount of moving image data is buffered, the least squares method may cause a large error due to the data amount being insufficient. In this case, with the imaging speed of the camera 30 being known, the frame rate measurer 103 may estimate the frame rate based on the imaging speed. For example, for the camera 30 that can capture images 60 times per second, the frame rate measurer 103 may estimate the frame rate as 60 fps. In this case, the coefficient of x in Formula 1 is 0.16667. A smaller amount of data does not increase the absolute error with this estimation and thus is less likely to cause issues.

In Embodiment 1, the frame rate measurer 103 calculates Formula 1 based on the frame number and the reception time. However, for the camera 30 that affixes a counter value measured by a clock counter to each frame, a formula similar to Formula 1 may be calculated based on the counter value and the reception time. For example, when the operation frequency of the clock counter in the camera 30 is 90 kHz and the frame rate of the moving image is 60 fps, the counter value increments by 1500 per frame. For example, when the frame rate of the moving image captured by the camera 30 is variable with irregular frame intervals, the counter value may thus be used. When the counter value is used, the coefficient of x in Formula 1 is expressed in seconds per clock instead of seconds per frame, and the frame rate is in clocks per second as the reciprocal of seconds per clock. Thus, the frame rate calculated using the counter value instead of the frame number is in a unit different from the unit of the common frame rate, but may be a frame rate expressed in a different unit.

In Embodiment 1, the moving image management device 20 includes the input device 220 and the display device 230, but the input device 220 and the display device 230 may be external devices.

Embodiment 2

A moving image management system 1 according to Embodiment 2 is now described with reference to the drawings. The moving image management system 1 has the same overall configuration as the moving image management system 1 according to Embodiment 1 illustrated in FIG. 1.

In Embodiment 1, the user defines the log reference point and the image reference point to remove the issue of latency. However, causing the user to define the log reference point and the image reference point increases the user burden. Moreover, incorrect definition of the reference point by the user can cause inconsistency in the interrelated reproduction.

In Embodiment 2, the PLC 10 automatically corrects latency. The PLC 10 causes a display device to display a predetermined pattern, causes the camera 30 to capture images of the predetermined pattern, and corrects latency to match the time at which the pattern is detected in the moving image with the log record time at which the pattern is displayed. The structure in Embodiment 2 may thus eliminate defining of the reference point by the moving image management device 20. This operation is described more specifically below.

Figure 10:
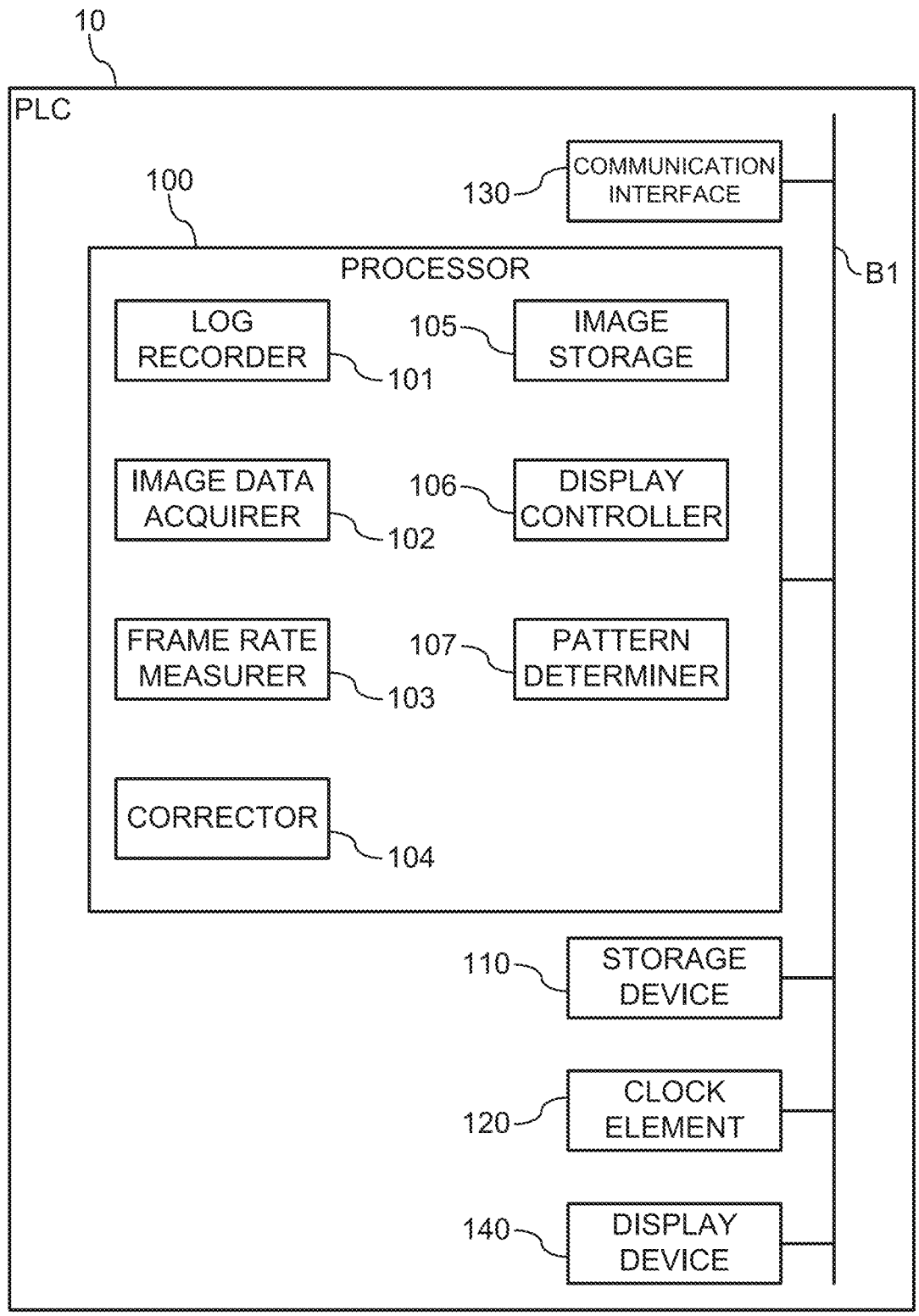
FIG. 10 is a block diagram of a PLC according to Embodiment 2 of the present disclosure.
Figure 11:
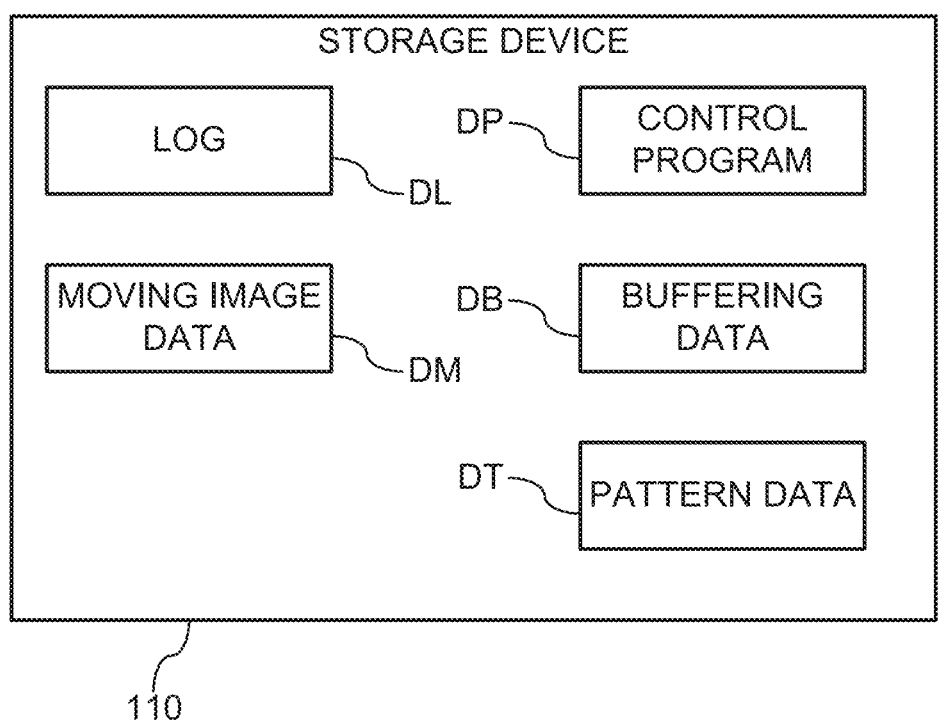
FIG. 11 is a diagram of data stored in a storage device in the PLC according to Embodiment 2 of the present disclosure.

With reference to FIGS. 10 and 11, the PLC 10 according to Embodiment 2 is described focusing on the differences from the PLC 10 according to Embodiment 1. FIG. 11 is a diagram of data stored in the storage device 110 in the PLC 10 according to Embodiment 2.

Unlike in Embodiment 1, the PLC 10 includes a display device 140 connected to the bus B1. The display device 140 is, for example, a lamp or a display on the housing surface of the PLC 10. The display device 140 is an example of a display device in an aspect of the present disclosure.

The camera 30 is to be located to capture images of the display device 140. As described below, the PLC 10 according to Embodiment 2 corrects latency using the pattern included in the moving image.

The functions implemented by the processor 100 reading and executing the control program DP is described. Unlike in Embodiment 1, the processor 100 additionally includes a display controller 106 and a pattern determiner 107 as functional components. As described below, the corrector 104 has a function slightly different from the functions of the corrector 104 in Embodiment 1.

Unlike in Embodiment 1, the storage device 110 illustrated in FIG. 11 additionally stores pattern data DT. As described above, some functions implemented by the processor 100 reading and executing the control program DP are different from the functions of the processor 100 in Embodiment 1, and the control program DP is also different from the control program DP in Embodiment 1.

The display controller 106 controls the display device 140 based on the pattern indicated by the pattern data DT and causes the display device 140 to display a predetermined pattern. For the display device 140 being a lamp, an example pattern is five blinks of the lamp in three seconds. As described below, the pattern may be easily determinable by the pattern determiner 107 that determines whether the moving image includes the pattern. When causing the display device 140 to display the pattern, the display controller 106 outputs the time at which the pattern is displayed to the corrector 104. The display controller 106 is an example of display control means in an aspect of the present disclosure.

The pattern determiner 107 determines, by referring to the buffering data DB and the pattern data DT stored in the storage device 110, whether the moving image indicated by the buffered moving image data includes a moving image resulting from imaging of the pattern indicated by the pattern data DT. For example, when the pattern data DT includes five blinks of the lamp in three seconds, the pattern determiner 107 determines whether the moving image indicated by the buffered moving image data includes a moving image of five blinks of the lamp in three seconds. When the pattern determiner 107 determines that the moving image indicated by the buffered moving image data includes a moving image resulting from imaging of the pattern, the pattern determiner 107 outputs the time affixed to the frame including the imaged pattern to the corrector 104. The pattern determiner 107 is an example of pattern determination means in an aspect of the present disclosure.

The corrector 104 in Embodiment 2 corrects the time to be affixed to the moving image based on the time at which the pattern is displayed that is output by the display controller 106 and the time affixed to the frame including the imaged pattern that is output by the pattern determiner 107. More specifically, the corrector 104 corrects the time to be affixed to the moving image to match the time at which the pattern is displayed with the time affixed to the frame including the imaged pattern. In this manner of correction, the corrector 104 in Embodiment 2 can remove the issue of latency as well.

Figure 12:
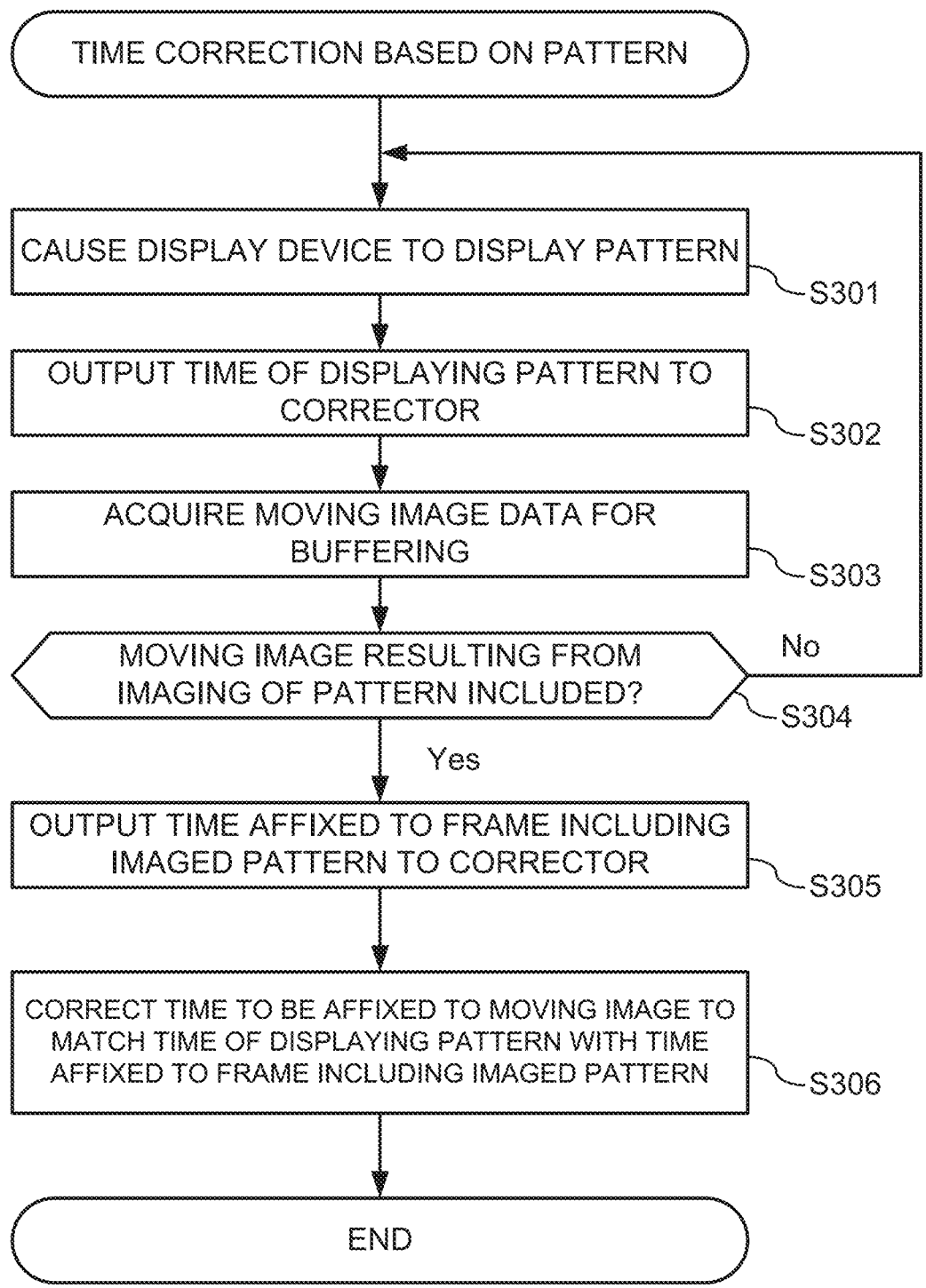
FIG. 12 is a flowchart of an example time correction operation performed on a moving image based on a pattern by the PLC according to Embodiment 2 of the present disclosure.

With reference to FIG. 12, an example operation performed by the PLC 10 according to Embodiment 2 to correct the time of the moving image based on the pattern is described. The operation illustrated in FIG. 12 is independent of the time correction performed in Embodiment 1 illustrated in FIG. 8. More specifically, the operation illustrated in FIG. 8 is also performed in Embodiment 2. In Embodiment 2, the operation illustrated in FIG. 8 removes the issues of clock difference and jitter, and the operation illustrated in FIG. 12 removes the issue of latency.

The display controller 106 in the PLC 10 causes the display device 140 to display the pattern (step S301). Subsequently, the display controller 106 outputs the time at which the pattern is displayed to the corrector 104 (step S302).

The image data acquirer 102 in the PLC 10 acquires moving image data from the camera 30 and buffers the moving image data in the storage device 110 (step S303).

The determiner 107 determines, by referring to the buffered moving image data, whether the buffered moving image data includes a moving image resulting from imaging of the pattern (step S304). When the determiner 107 determines that the buffered moving image data includes no moving image resulting from imaging of the pattern (No in step S304), the processor 100 in the PLC 10 repeats the operation in step S301 and subsequent steps.

When the determiner 107 determines that the buffered moving image data includes a moving image resulting from imaging of the pattern (Yes in step S304), the pattern determiner 107 outputs the time affixed to the frame including the imaged pattern to the corrector 104 (step S305).

The corrector 104 corrects the time to be affixed to the moving image to match the time at which the pattern is displayed with the time affixed to the frame including the imaged pattern (step S306). The processor 100 then ends the pattern-based time correction of the moving image.

The moving image management system 1 according to Embodiment 2 described above corrects the time to be affixed to the moving image to match the time at which the pattern is displayed on the display device 140 with the time affixed to the frame including the imaged pattern to remove the issue of latency with less burden on the user. Thus, the moving image management system 1 according to Embodiment 2 can match the time affixed to the moving image with the log record time recorded by the PLC with less burden on the user than in Embodiment 1.

Modification of Embodiment 2

In Embodiment 2, the PLC 10 includes the display device 140, but may eliminate the display device and cause an external display to display the pattern. For example, when the camera 30 is at a location at which the camera 30 cannot capture images of the PLC 10, an external display may be located to allow the camera 30 to capture images of the external device and display the pattern. This produces the same effect as the structure in Embodiment 2.

Embodiment 3

In Embodiments 1 and 2, the PLC 10 can remove the issues of clock difference and jitter. In some embodiments, the moving image management device 20 may remove the issues of all of the clock difference, jitter, and latency as described below, although the accuracy may be low.

In a moving image management system 1 according to Embodiment 3, the moving image management device 20 causes the user to define two reference points for each of the log and the moving image. The moving image management device 20 then performs interrelated reproduction of the log and the moving image to align the two reference points of the log with the two reference points of the moving image.

The moving image management device 20 according to Embodiment 3 has substantially the same configuration as the moving image management device 20 according to Embodiment 1 illustrated in FIG. 5, but differs in the components described below.

Unlike in Embodiment 1, the log reference point definer 202 causes the user to define two log reference points. Hereafter, these log reference points are referred to as a first log reference point and a second log reference point.

Unlike in Embodiment 1, the image reference point definer 203 causes the user to define two image reference points. Hereafter, these image reference points are referred to as a first image reference point and a second image reference point. The first log reference point and the first image reference point may be referred to as a first reference point without distinction as appropriate, and the second log reference point and the second image reference point may be referred to as a second reference point without distinction as appropriate.

Unlike in Embodiment 1, the display controller 204 performs interrelated reproduction of the log and the moving image to align the first log reference point with the first image reference point and the second log reference point with the second image reference point. Unlike in Embodiment 1, the interrelated reproduction based on the two reference points, or more specifically, the first reference point and the second reference point, can remove the issues of clock difference and jitter in addition to the issue of latency, as described below.

The clock difference represents a difference in frame interval between in the imaging and at the reception. The display controller 204 performs interrelated reproduction to align the first log reference point with the first image reference point and the second log reference point with the second image reference point. Thus, the interval from the first log reference point to the second log reference point is equal to the interval from the first image reference point to the second image reference point. An average frame interval is thus estimated to be the same in the imaging and at the reception based on the time in the imaging corresponding to the log record time.

The issue of jitter causes a variation of frame intervals. The display controller 204 performs interrelated reproduction to align the first log reference point with the first image reference point and the second log reference point with the second image reference point, and thus can perform interrelated reproduction at substantially regular frame intervals. For example, an average frame interval can be calculated based on the total number of frames and the time from the first reference point to the second reference point. Thus, displaying the frames based on the calculated average frame intervals can reduce the variation of the frame intervals.

However, the issues of clock difference and jitter may be removed insufficiently when the first referent point and the second reference point are highly close to each other.

The moving image management system 1 according to Embodiment 3 described above can match, independently of the PLC 10, the time affixed to the moving image with the log record time recorded by the PLC by causing the user to define the first reference point and the second reference point.

Other Modifications

In each of the embodiments, the log reference point definer 202 in the moving image management device 20 defines the log reference point based on a user input. In some embodiments, the log reference point definer 202 may define the time at which a trigger is generated as the log reference point independent of a user input.

Figure 13:
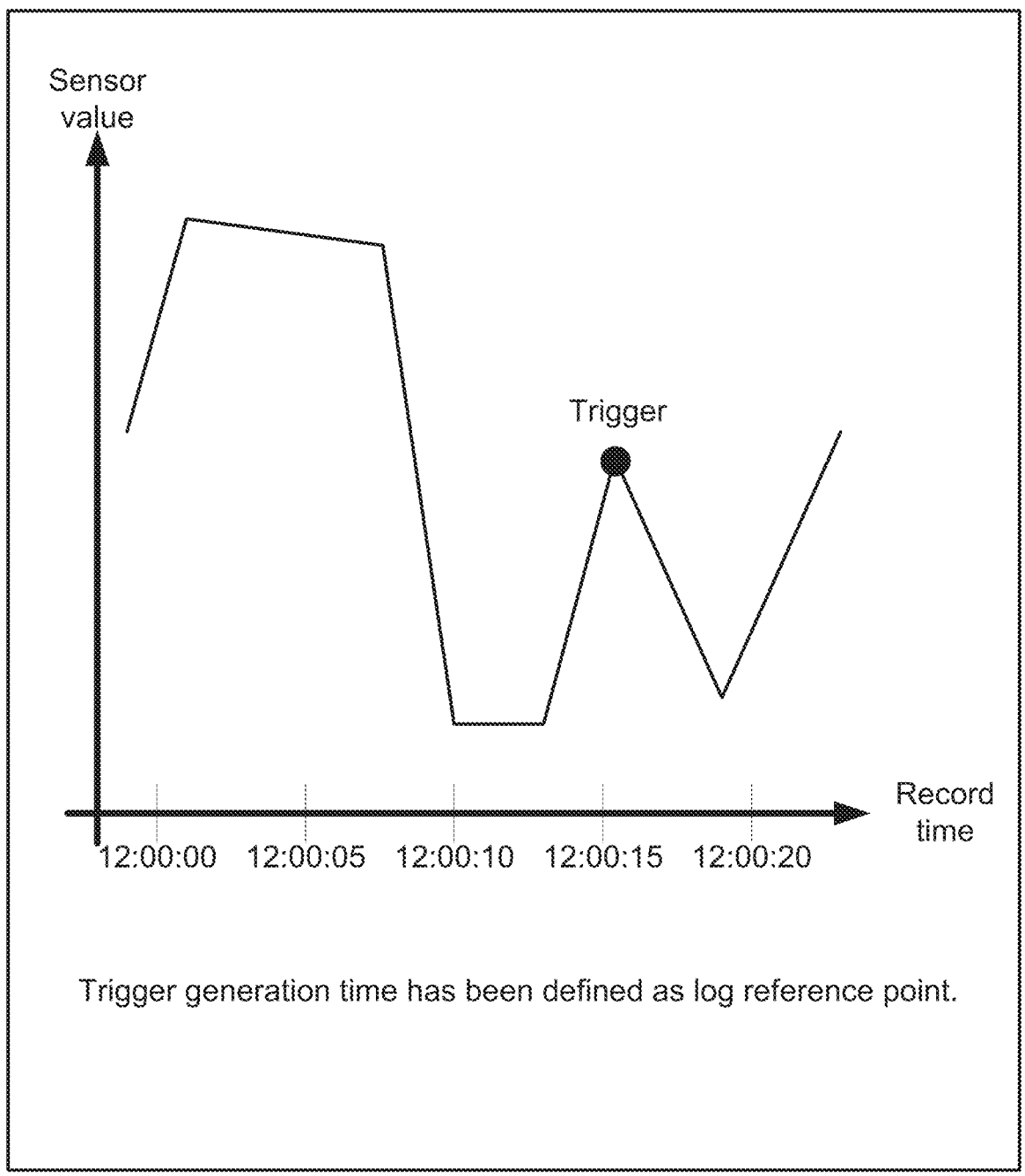
FIG. 13 is a diagram of an example notification screen of a log reference point displayed by a moving image management device according to a modification of the present disclosure.

More specifically, upon generation of a trigger, the log recorder 101 in the PLC 10 records the log in association with the trigger. The log record time associated with the trigger serves as the time at which the trigger is generated. For example, the log recorder 101 records the trigger number that identifies the trigger into the log. The log reference point definer 202 defines the time at which the trigger is generated as the log reference point. The log reference point definer 202 then causes, for example, the notification screen illustrated in FIG. 13 to be displayed and notifies the user that the time at which the trigger is generated is defined as the log reference point. As in Embodiments 1 and 2, the image reference point definer 203 then causes the screen illustrated in FIG. 7 to be displayed.

Figure 9:
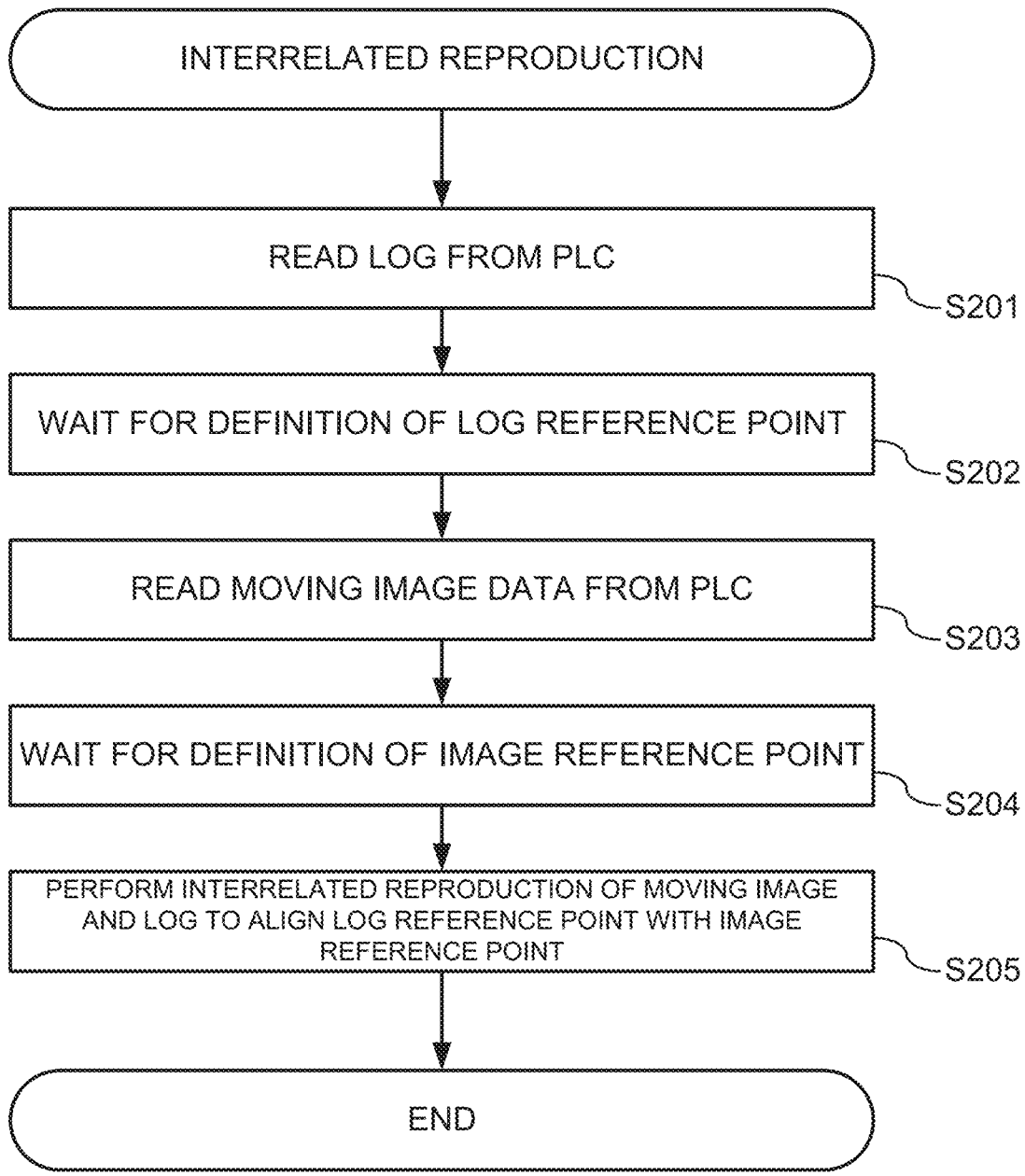
FIG. 9 is a flowchart of an example operation of interrelated reproduction of the log and the moving image performed by the moving image management device according to Embodiment 1 of the present disclosure.

Unlike in each embodiment, this structure eliminates the operation of waiting for the user to define the log reference point in step S202 in FIG. 9, thus reducing the burden on the user.

Figure 14:
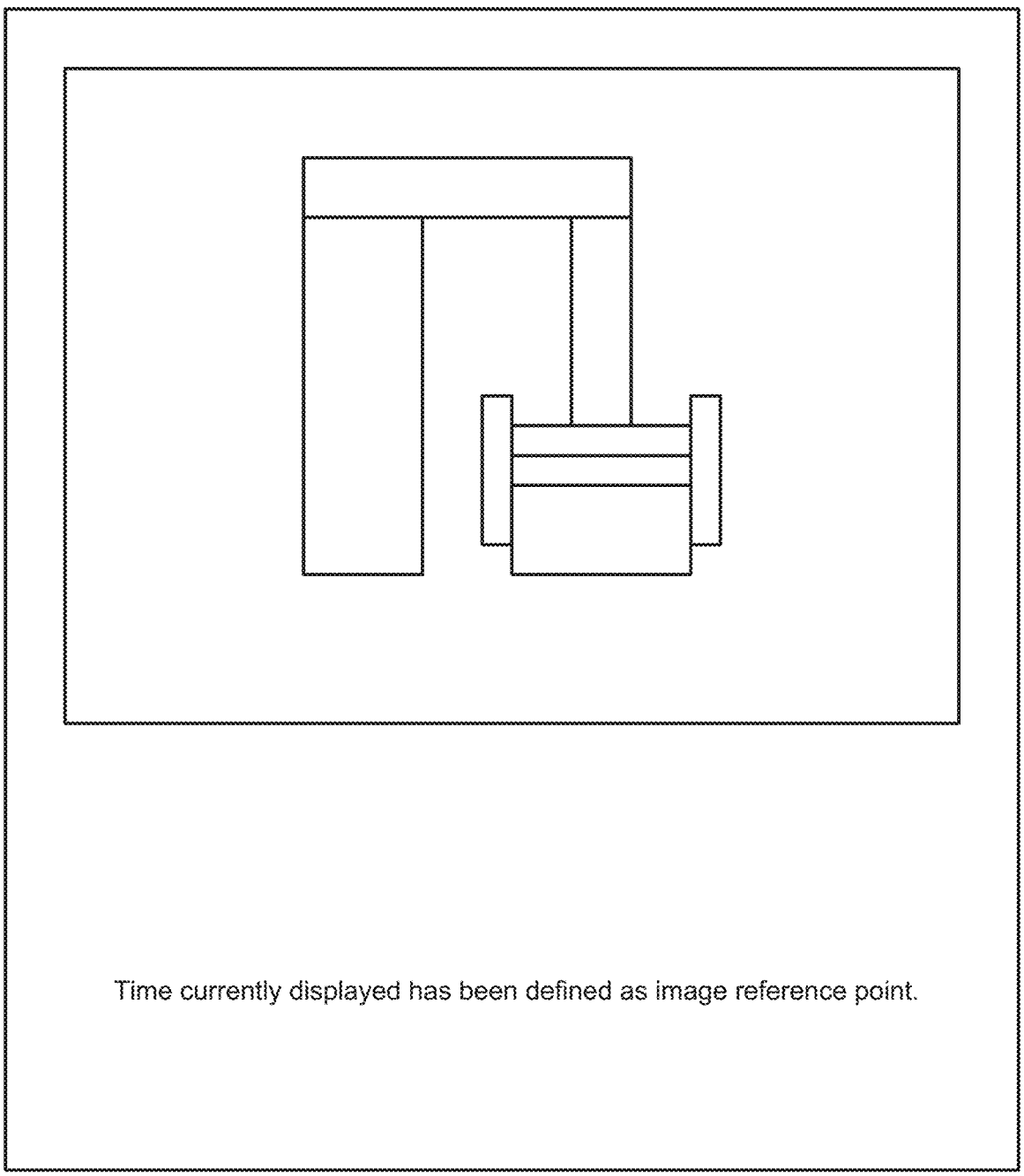
FIG. 14 is a diagram of an example notification screen of an image reference point displayed by a moving image management device according to the modification of the present disclosure.

In some embodiments, whereas the log reference point definer 202 defines the log reference point based on a user input, the image reference point definer 203 may define the time at which the trigger is generated as the image reference point independent of a user input. For example, the image reference point definer 203 causes the notification screen illustrated in FIG. 14 to be displayed and notifies the user that the displayed time is defined as the image reference point. The user defines the log reference point while referring to the displayed image.

In this state, the time affixed to the moving image by the image storage 105 does not match the log record time recorded by the log recorder 101, and thus the image displayed on the notification screen does not match the image captured by the camera 30 at the time at which the trigger is generated. However, the displayed image is an image acquired around the time at which the trigger is generated. The user can thus examine, while referring to the displayed image, the detailed log around the time at which the trigger is generated with, for example, the screen illustrated in FIG. 6. Thus, although the displayed image is not an image captured at the time at which the trigger is generated, the user can define the log reference point corresponding to the displayed image from around the time at which the trigger is generated.

Unlike in each embodiment, this structure eliminates the operation of waiting for the user to define the image reference point in step S204 in FIG. 9, thus reducing the burden on the user. In this case, the operation in step S203 illustrated in FIG. 9 is performed before the operation in step S201.

The programs used by the PLC 10 or the moving image management device 20 may be stored in a non-transitory computer-readable recording medium, such as a compact disc read-only memory (CD-ROM), a digital versatile disc (DVD), a USB flash drive, a memory card, or an HDD, and may then be distributed. Such programs may be installed on a dedicated programmable logic controller or a general-purpose computer to cause the controller or the computer to function as the PLC 10 or the moving image management device 20.

The programs described above may be stored in a storage device in another server on the Internet and may then be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Moving image management system
10 PLC
20 Moving image management device
30 Camera
100 Processor
101 Log recorder
102 Image data acquirer
103 Frame rate measurer
104 Corrector
105 Image storage
106 Display controller
107 Pattern determiner
110 Storage device
120 Clock element
130 Communication interface
140 Display device
200 Processor
201 Data acquirer
202 Log reference point definer
203 Image reference point definer
204 Display controller
210 Storage device
220 Input device
230 Display device
240 Communication interface
B1, B2 Bus
DB Buffering data
DL Log
DM Moving image data
DP Control program
DT Pattern data

The invention claimed is:
1. A programmable logic controller, comprising:
a clock;
a log recorder to record a log together with a record time into a first storage device based on a clock signal output from the clock;
an image data acquirer to acquire moving image data indicating a moving image captured by an imager from the imager;
a frame rate measurer to measure a frame rate of the moving image indicated by the moving image data based on the clock signal output from the clock;
a corrector to correct a time to be affixed to the moving image indicated by the moving image data based on the frame rate;
an image storage to store, into a second storage device, new moving image data indicating a moving image affixed with the time corrected by the corrector;
a display controller to cause a display to display a predetermined pattern; and
a pattern determiner to determine whether the moving image indicated by the moving image data includes a moving image resulting from imaging of the pattern,
wherein the corrector corrects, when the pattern determiner determines that the moving image indicated by the moving image data includes the moving image resulting from imaging of the pattern, the time to be affixed to the moving image indicated by the moving image data based on a time at which the display controller causes the pattern to be displayed.

2. A moving image management device, comprising:
a log reference point definer to define a log reference point being a time-series reference point in the log recorded into the first storage device by the log recorder in the programmable logic controller according to claim 1;
an image reference point definer to define, based on a user input, an image reference point being a time-series reference point in the moving image indicated by the new moving image data stored into the second storage device by the image storage in the programmable logic controller; and
a display controller to cause a display to display the log and the moving image indicated by the new moving image data in an interrelated manner to align the log reference point with the image reference point.

3. A moving image management system, comprising:
the programmable logic controller according to claim 1; and
a moving image management device, wherein the moving image management device comprises:
a log reference point definer to define a log reference point being a time-series reference point in the log recorded into the first storage device by the log recorder in the programmable logic controller,
an image reference point definer to define, based on a user input, an image reference point being a time-series reference point in the moving image indicated by the new moving image data stored into the second storage device by the image storage in the programmable logic controller, and
a display controller to cause a display to display the log and the moving image indicated by the new moving image data in an interrelated manner to align the log reference point with the image reference point.

4. A moving image management device, comprising:
a log reference point definer to define, based on a user input, two time-series reference points including a first log reference point and a second log reference point in a log recorded into a first storage device by a programmable logic controller;
an image reference point definer to define, based on the user input and independent from the defining by the log reference point definer, two time-series reference points including a first image reference point and a second image reference point in a moving image indicated by moving image data stored into a second storage device by the programmable logic controller; and
a display controller to cause a display to display the log and the moving image indicated by the moving image data in an interrelated manner to align the first log reference point with the first image reference point and the second log reference point with the second image reference point.

5. A method for managing a moving image with a programmable logic controller, the method comprising:
recording a log of the programmable logic controller together with a record time into a first storage device based on a clock signal output from a clock included in the programmable logic controller;
acquiring moving image data indicating a moving image captured by an imager from the imager;
measuring a frame rate of the moving image indicated by the moving image data based on the clock signal output from the clock;
correcting a time to be affixed to the moving image indicated by the moving image data based on the frame rate;
storing, into a second storage device, new moving image data indicating a moving image affixed with the corrected time;
displaying a predetermined pattern; and
determining whether the moving image indicated by the moving image data includes a moving image resulting from imaging of the pattern,
wherein the correcting the time includes correcting, when it is determined that the moving image indicated by the moving image data includes the moving image resulting from imaging of the pattern, the time to be affixed to the moving image indicated by the moving image data based on a time at which the pattern is displayed.

* * * * *